PERMEABLE MEMBRANE

*INVENTOR*
Yves Henderyckx

BY *Spencer & Kaye*

ATTORNEYS

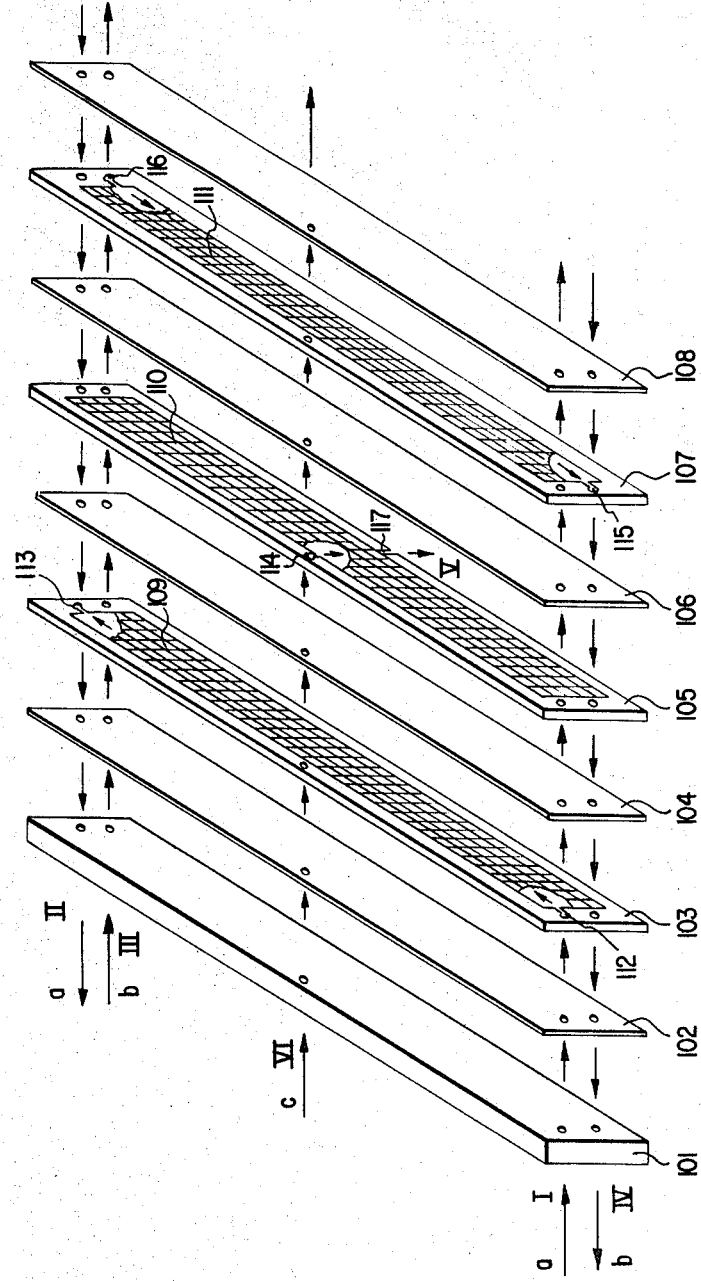

United States Patent Office 3,563,860
Patented Feb. 16, 1971

3,563,860
EVAPORATION-CONDENSATION RECOVERY OF A SOLUTION COMPONENT USING VAPOR-PERMEABLE WALL SPACED FROM A COLD WALL
Yves Henderyckx, 35 Rue du Baillois, Bourgeois, Belgium
Filed Mar. 14, 1968, Ser. No. 713,073
Claims priority, application Belgium, Mar. 16, 1967, 41,134
Int. Cl. B01d 1/22; C02 1/06
U.S. Cl. 202—172
6 Claims

ABSTRACT OF THE DISCLOSURE

A process and apparatus for separating a component from a solution by circulating hot liquid to be distilled and, in countercurrent thereto, cooling liquid at respectively opposite sides of a gaseous region situated between a membrane which is permeable to the vapor of the component to be separated and a cold wall on which that vapor is to condense.

BACKGROUND OF THE INVENTION

The present invention relates to the separation of a component from a solution, and particularly to the separation of such a component by evaporation and subsequent condensation thereof on a wall which is cooled by a circulating cold liquid.

Such a process is utilized, for example, for obtaining soft water by distilling salt water and for concentrating solutions by eliminating one of their components in the form of a vapor. In the latter case, it is the component having the lowest boiling point which is eliminated first. The field of use of such processes extends to all solutions having at least one component which can be at least partially eliminated by evaporation.

The known processes of this type present the serious inconvenience that, with the exception of certain particular cases, their thermal efficiency is so low that their use can not be economically justified. In addition, they have the inconvenience that they require many complex regulation circuits which substantially complicate the carrying out of the processes and which substantially limit the possibilities for adjusting the processes in response to varying conditions or in accordance with varying requirements.

SUMMARY OF THE INVENTION

It is a primary object of the present invention to substantially reduce these drawbacks and difficulties.

Another object of the invention is to facilitate the separation of a component from a solution.

Another object of the invention is to increase the efficiency of such a separation.

Still another object of the invention is to simplify the control which must be exerted on such processes.

Yet another object of the invention is to decrease the cost of such processes.

A still further object of the invention is to provide simplified apparatus for carrying out such processes.

These and other objects according to the invention are achieved by a method of separating at least one component from a liquid solution by evaporation of the component and subsequent condensation of the resulting vapor on a cold wall. The method according to the invention includes the steps of placing the solution in a state which will produce evaporation of the component, circulating the solution adjacent a gaseous region and along a boundary thereof which separates the solution from the region and which is defined by an element permeable to the vapor, so as to cause the vapor to diffuse through the element and across the region, and circulating a cooling fluid adjacent the region and along another boundary thereof, which other boundary is defined by the cold wall, for condensing the vapor in the region on such cold wall. This procedure serves to promote a heat exchange between the solution and the fluid.

The objects according to the invention are further achieved by a device for separating at least one component from a liquid solution by evaporation of the component and subsequent condensation of the resulting vapor. This device essentially includes means defining a first chamber for the circulation of the solution, a wall of which chamber is permeable only to the vapor of the component to be separated, and means defining a second chamber for the circulation of a cooling fluid, a wall of which second chamber constitutes a cold wall. The chambers of this device are arranged so that the permeable wall and the cold wall face one another and together define the walls of a gaseous region into which the vaporous component diffuses from the first chamber and in which the component condenses on its associated cold wall while tranferring heat to the cooling fluid in the second chamber.

It is to be understood that the present invention is intended to be employed for the treatment not only of true solutions, such as that formed when a salt, a solid compound, a liquid or a gas dissolves in a liquid, but also for liquids containing sub-microscopic particles and microorganisms, such as bacteria or viruses, for example. Thus, when the term "solution" is employed in the present specification and claims, it is intended to include liquids of this type.

BRIEF DESCRIPTION OF THE DRAWINGS

FIG. 3 is an exploded, perspective view of a preferred embodiment of the central cell of apparatus according to the invention.

DESCRIPTION OF THE PREFERRED EMBODIMENTS

Figure 1:
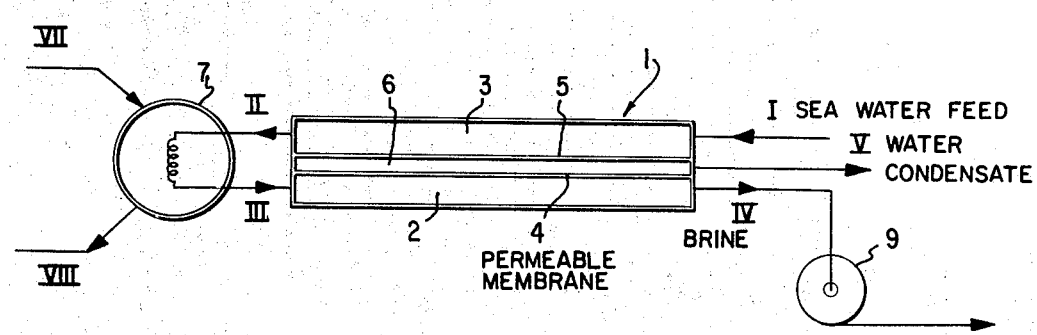
FIG. 1 is a schematic illustration of basic apparatus according to the invention.

Referring first to FIG. 1 of the drawings, there is shown, in simplified schematic form, a basic apparatus for carrying out the present invention, the central element of this apparatus being a cell 1 having a first chamber 2 through which circulates the liquid from which one component is to be removed, this liquid being, for example, salt water from which soft, or fresh, water is to be produced. The cell 1 has a second chamber 3 through which the cooling liquid circulates. In the arrangement of FIG. 1, the cooling liquid is constituted by the salt water, i.e. the liquid from which one component is to be removed.

A wall 4 of the chamber 2, which faces chamber 3, is constituted by a membrane which is permeable only to water vapor. Such a membrane may be made, for example, of cellulose acetate.

A wall 5 of the chamber 3, which faces the chamber 2, constitutes a cold wall and is preferably made of a thin piece of plastic material. The permeable membrane 4 and the cold wall 5 define a chamber 6 which contains the gaseous region. This chamber 6 may contain air, for example, or any other suitable gas. The nature of the gas in chamber 6 is determined on the basis of the nature of the liquid to be treated.

The inlet to the chamber 2 is represented by III and the outlet therefrom by IV. Similarly, the inlet to chamber 3 is indicated by reference numeral I and the outlet therefrom by II. Between the outlet II of the chamber 3 and the inlet III of the chamber 2 is connected an ordinary heat exchanger 7 having an inlet VII and an outlet VIII for heating fluid. Finally, the chamber 6 is connected to an evacuation line V for drawing off the collected liquid after it has condensed.

The arrangement illustrated in FIG. 1 operates in the following manner: Salt water enters the chamber 3 via inlet I and acts to cool the wall 5 while circulating therealong. At the same time, the temperature of the salt water increases as it circulates along the wall. The preheated salt water is then delivered via outlet 2 into heat exchanger 7 where it is heated by the desired amount. From the outlet of the heat exchanger 7, the hot salt water passes through inlet III into the chamber 2 and the water vapor leaving the hot salt water traverses the permeable membrane 4 and condenses on the wall 5 while transferring its heat to the salt water contained in chamber 3. The salt water is withdrawn via the outlet IV by a pump 9. The flow rate of liquid to be treated through the cell 1 can be readily regulated by controlling the operation of pump 9.

As is evident from FIG. 1, the liquids contained in the two chambers 2 and 3 circulate in countercurrent to one another. The arrangement of the chambers is such that the cell in fact functions as a countercurrent heat exchanger in which the heat contained in the liquid in chamber 2 is transferred by evaporation and condensation across the gaseous region 6 toward the liquid contained in the chamber 3.

The temperature of the liquid circulating through chamber 3 rises continuously as the liquid flows from the inlet I to the outlet II in a continuous fashion and without shocks, while the temperature of the liquid through chamber 2 drops in the same manner as the liquid flows from the inlet III to the outlet IV. As a result, the temperature of the liquid flowing out of chamber 2 via outlet IV can be very close to the temperature of the liquid flowing into chamber 3 via inlet I. Similarly, the temperatures of the liquid at outlet II and inlet III could be close to one another to the extent that the external walls of the cell 1 are thermally well insulated.

Finally, the condensed fresh water is drawn off via outlet V for storage or utilization.

Thus, the apparatus shown in FIG. 1 is such that the vapor phase of the component to be eliminated from a liquid is caused to diffuse across a gaseous region while a cooling liquid and the liquid from which the component is to be separated are caused to circulate along respectively opposite sides of the region in order to effect a heat exchange between the two liquids.

This procedure has the advantage of creating a highly efficient heat exchange between the liquid from which a component is to be separated, which is necessarily at a high temperature, and the cooling liquid, the heat exchange taking place in a manner similar to that occurring in a heat exchanger employing circulation of fluids. The heat exchange according to the present invention is effectuated by the transfer of the latent heat contained in the vapor when this vapor condenses so as to liberate such heat.

The regulation of the process according to the invention is particularly simple since it requires only a control of the flow rates of each of the liquids.

In order to assure that the heat exchange will be highly efficient, the gaseous region is preferably very thin and may have a thickness, for example, of the order of 7 mm.

Preferably, the liquid from which a component is to be separated and/or the cooling liquid circulate in the form of thin layers. This offers the advantage of imparting a great deal of flexibility to the process by diminishing the heat capacity of the liquids in the region where the heat exchange takes place. This also has the advantage of substantially improving the response time of the liquids to temperature variations. In addition, since the liquid volumes involved are quite small, the apparatus for carrying out the process of the invention can be quite compact.

In order to make the most efficient use of the heat recovered from the vapor, the cooling liquid is advantageously constituted by the liquid from which a component is to be separated. It thus results that the amount of heat which must be delivered from the exterior in order to effect the evaporation of the component to be removed will be very small.

This is particularly the case when, according to the invention, the liquid from which a component is to be separated and the cooling liquid circulate in countercurrent to one another. In this case, the temperature at the cooling liquid outlet can be very close to the temperature of the liquid at the inlet to the evaporation chamber.

The simplicity of the operation is thus increased. In effect, in this case, the liquid flow rate can be controlled by means of the single pump 9 since the temperatures existing in the different parts of the liquid circulation system will adjust themselves to the liquid flow rate and hence to the quantity of the component being separated by evaporation.

According to one particular feature of the invention, the gaseous region 6 is placed at a pressure which is different from that existing outside of the apparatus. The pressure in the region 6 could be either above or below the ambient pressure, depending on the conditions under which the process is to be carried out and the nature of the liquid which is to undergo separation. A pressure above ambient will be utilized in order to facilitate the removal of the condensate when it is possible to prevent the movement of the permeable wall against the cold wall. On the other hand, the gaseous region will be placed at a pressure below ambient when it is desired to facilitate the evaporation of the component which is to be separated.

The arrangement illustrated in FIG. 1 represents a particularly efficient utilization of space since each of the chambers is quite thin and since the cold wall and the permeable wall each defines a large surface of one of the chambers.

It is desirable, in further accordance with the present invention and for the purpose of enabling large liquid flow rates to be treated, to construct an apparatus according to the invention made up of a plurality of first chambers each having two walls which are permeable only to the vapor of the component to be withdrawn and a plurality of second chambers having two cold walls, the chambers being stacked in such a manner that first and second chambers alternate with one another, with a chamber defining a gaseous region being interposed between each adjacent pair of first and second chambers.

Figure 2:
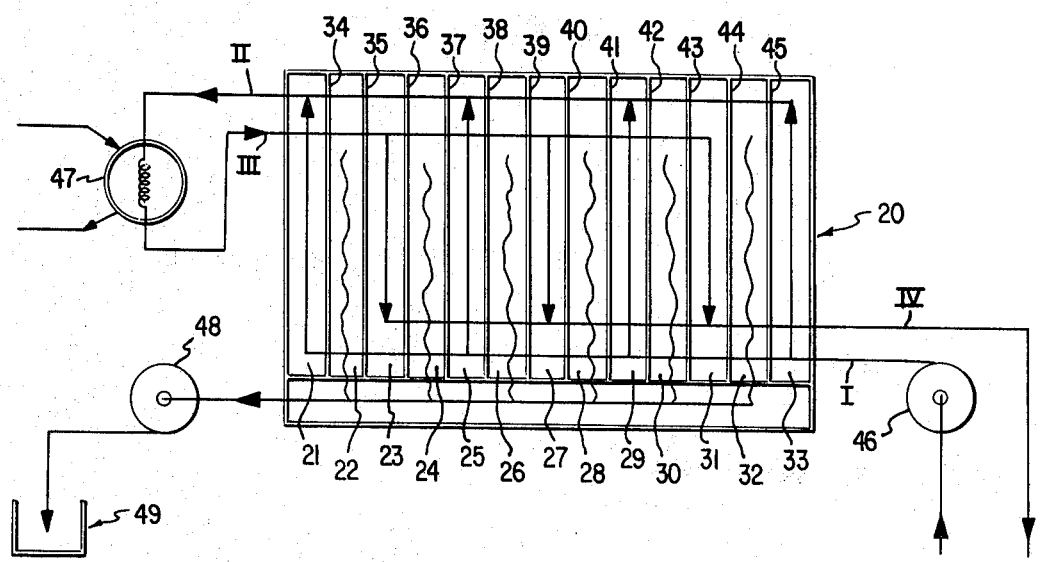
FIG. 2 is a schematic view of another form of basic apparatus according to the invention.

One such arrangement is shown schematically in FIG. 2 wherein each individual chamber is analogous to one of the chambers of the cell 1 of FIG. 1. In the arrangement of FIG. 2, a large cell 20 is provided with a large number of such chambers disposed in parallel to one another. The chambers 21, 25, 29 and 33 are connected to cooling liquid inlet I and cooling liquid outlet II. These chambers are provided with cold walls 34, 37, 38, 41, 42 and 45, respectively.

The hot liquid to be separated circulates through chambers 23, 27 and 31, which chambers are connected between hot liquid inlet III and hot liquid outlet IV. These chambers are bounded by permeable walls 35, 36, 39, 40, 43 and 44, respectively. Outlet II and inlet III are connected together via an ordinary heat exchanger 47.

Finally, gaseous regions are defined by chambers 22, 24, 26, 28, 30 and 32, all connected to a liquid removal pump 48 delivering condensed liquid to a container 49. Cooling liquid is delivered to inlet I by a pump 46, while the liquid from which one component has been separated is delivered from outlet IV to a suitable receptacle or is eliminated.

It may be noted that in the arrangement of FIG. 2, the chambers disposed in the cell 20 are so arranged that a chamber defining a gaseous region is interposed between each adjacent pair of other chambers and that the chambers bounded by cooling walls and carrying the cooling fluid alternate with the chambers bounded by permeable walls and carrying the hot liquid.

The apparatus illustrated in FIG. 2 functions in a manner similar to that of the apparatus of FIG. 1. The liquid to be treated is delivered via inlet I by a pump 46 into the chambers 21, 25, 29 and 33 and circulates through these chambers so as to cool the walls 34, 37, 38, 41, 42 and 45. This liquid, which is preheated during its passage through such chambers, leaves the cell 20 via outlet II and is heated in heat exchanger 47 to the temperature required for the evaporation of the component to be separated.

Then, the hot liquid is delivered via inlet III to the chambers 23, 27 and 31 from which the vapor component to be separated diffuses through the permeable walls 35, 36, 39, 40, 43 and 44, traverses the gaseous regions defined by chambers 22, 24, 26, 28, 30 and 32 and condenses on the cold walls 34, 37, 38, 41, 42 and 45.

The nonevaporated hot liquid leaves the cell 20 via outlet IV, while the separated vapor condenses and flows down the cold walls in the compartments 22, 24, 26, 28, 30 and 32 defining gaseous regions. This condensed liquid is collected at outlet V and delivered to a storage reservoir 49 by a suitable exhaust pump 48. The action of exhaust pump 48 serves to establish a low pressure in the compartments 22, 24, 26, 28, 30 and 32, thus aiding the evaporation of the component which is to be separated.

One of the great advantages of arrangements of the type illustrated in FIG. 2 is that the loss of heat to the exterior of the cell is very small, this being primarily because each compartment containing hot liquid is sandwiched between two compartments containing cold liquid so that it is almost inevitable that all of the heat lost by the hot liquid in any compartment will be absorbed by the cold liquid in adjacent compartments. To maximize this effect, the two outer compartments of the cell 20 are preferably connected as cold liquid circulation compartments.

A preferred practical embodiment of the cell 20 of FIG. 2 is constituted by a stack of flat walls separated from one another by joints, or gaskets, in the form of rectangular frames defining the various chambers, and the assembly of flat walls and gaskets is maintained in place between two clamping plates.

A portion of one such arrangement is shown in detail in FIG. 3 which shows one of the clamping plates 101 for a cell. The drawing shows only one chamber of each type and one clamping plate in order not to unduly complicate the illustration. However, it will be appreciated that a complete cell according to the invention will have several more elements of the type illustrated and a second clamping plate, or pressure plate, at the other end of the assembly. The fluid-tightness of the various chambers will be assured by the tight clamping of the stack between the two clamping plates. The clamping of the two plates can be effected by any known clamping device (not shown).

The walls 102 and 104 of the arrangement of FIG. 3 are of a material which is impermeable to the cooling liquid. These are to constitute cold walls and are preferably made of polypropylene sheets having a thickness of the order of 0.1 mm. The walls 106 and 108 constitute the membranes which are permeable to the vapor of the component to be removed and they are preferably made of cellulose acetate sheets also having a thickness of the order of 0.1 mm.

The gaskets, or frames, 103, 105 and 107 are interposed between adjacent walls and each surrounds a respective one of the spacers 109, 110 and 111. The thickness of the joints is of the order of 1 mm. The spacers, which are in the form of screens of polypropylene, for example, have a thickness which is less than or equal to that of the gaskets.

The pressure plates, the cold walls, the membranes and the gaskets are all provided at their edges with five series of holes, the holes of the same series being in alignment with one another to form a fluid passage. In general, the aligned holes cooperate to defined parts of three fluid circuits a, b and c. The passages defined by each series of holes are placed in communication with the appropriate chambers, each of which chambers is defined by two walls and one gasket, by means of channels cut in the gaskets, each channel joining one hole in the gasket with the interior of the chamber. Thus, the chamber defined by gasket 103 communicates with circuit a by means of channels 112 and 113, while the chamber defined by gasket 105, which chamber constitutes a gaseous region, communicates with circuit c by means of channels 114 and 117, and the hot liquid chamber defined by gasket 107 communicates with circuit b via channels 115 and 116.

Thus, the elements 102, 103, 104 and 109 form a chamber through which cooling liquid circulates. Elements 106, 107, 108 and 111 form a chamber through which circulates the hot liquid from which one component is to be separated. Elements 104, 105, 106, and 110 form a chamber defining a gaseous region.

Circuit a constitutes the cooling liquid circuit beginning with inlet I and ending with outlet II. Similarly, the circuit b is the circuit for the hot liquid from which one component is to be separated and commences with an inlet III and terminates with an outlet IV.

The circuit c is, in the specific embodiment illustrated in FIG. 3, provided for permitting a slight overpressure in the chambers defining the gaseous regions in which the vaporous component to be separated is condensed and collected. This circuit has an inlet VI and an outlet V. Such an overpressure serves to facilitate the drainage of the separated liquid via channel 117. However, the circuit c need not be provided when the drainage of the liquid is to be effectuated by suction, which would be applied to the interior of the chamber via channel 117.

The cooling liquid, which flows through circuit a, flows first through the inlet I, passes through the openings in plate 101 and wall 102 and then arrives at the channel 112 in gasket 103. A portion of this liquid passes through the channel 112 and circulates along the chamber formed by the elements 102, 103, 104 and 109. The remainder of the cooling liquid continues to flow through the openings in walls 104, 106 and 108 and gaskets 105 and 107 toward the other cooling liquid circulation chambers (not shown) provided in the stack.

The liquid entering the cooling chamber flows toward the side of the gasket in which channel 113 is provided and is heated by the heat given up by the vapor as it condenses on the cold wall 104, this condensate forming on the face of wall 104 which is directed toward gasket 105.

The preheated liquid leaves via channel 113 and then passes through the aligned openings in wall 102 and pressure plate 101 so as to leave via outlet II. Upon leaving via channel 113, this liquid mixes with the preheated cooling liquid emerging from the other cooling liquid chambers.

The hot liquid from which one component is to be separated enters the apparatus via inlet III. This hot liquid may, as discussed above, be obtained by passing the preheated cooling liquid from outlet II through a suitable heating device and then back to inlet III. The liquid entering via inlet III passes through the aligned holes in plate 101, walls 102, 104 and 106, and gaskets 103 and 105, until arriving at the aligned hole in gasket 107, which hole communicates with the chamber defined by elements 106, 107, 108 and 111 via a channel 116. A portion of the hot liquid passes through channel 116 and circulates along the length of the compartment, while the remainder of the hot liquid continues to flow through the aligned openings in the various elements until reaching the other hot liquid chambers (not shown) provided in the stack.

As the liquid which has passed through channel 116 circulates along the length of the chamber, it is cooled primarily as a result of the heat removed therefrom by the evaporation of the component to be separated and the diffusion of that component through the membranes 106 and 108.

At the outlet 115 of this chamber, the liquid which has not evaporated is joined by the liquid coming from the other hot liquid chambers and passes through the aligned openings in the other elements until reaching the outlet IV.

The vapor diffusing through the membrane 106 passes through the region defined by gasket 105, condenses on the wall 104, and flows down this wall until reaching the upper surface of the bottom strip of gasket 105.

Figure 4:
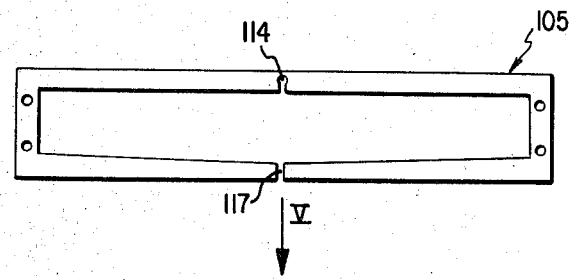
FIG. 4 is an elevational view of one element of the structure of FIG. 3.

As is shown in the elevational view of this gasket in FIG. 4, both sides of this lower edge are inclined toward the drain channel 117 in order to permit the condensed liquid collecting on the upper surface of this edge to flow to the channel 117. The condensed liquid flowing through the channel 117 leaves the apparatus via outlet V which, in a practical embodiment of the invention, may include a small trough or drain pan disposed below the channels 117 of all of the gaskets constituting gaseous regions.

Each of these gaseous regions could be subjected to a slight overpressure by means of circuit c and channel 114, which over-pressure would have the effect of accelerating the evacuation of condensed liquid via the channel 117.

The practical embodiment illustrated in FIG. 3 is highly advantageous in that it is readily assembled and disassembled and its liquid-treating capacity can be readily varied by simply adding or removing units. Moreover, the cell is made up of a small number of different types of elements and each element is of extremely simple construction. Therefore, a cell constructed of these elements is relatively inexpensive, and it is a simple matter to stock additional parts for the cell.

Although preferred embodiments of the invention employ gaskets which are separate from the walls, it would be within the spirit of the invention to provide units each constituted by one gasket integral with one or two walls, thus facilitating the assembly of the complete cell.

The spacer with which each gasket is provided is substantially coextensive with the adjacent walls and serves to prevent any contact between a permeable membrane and the cold wall which it faces and hence to maintain the proper thickness for the gaseous region defined between each wall and membrane. A secondary purpose of the spacer is to maintain the shape of its associated gasket during assembly of the cell. It is for this reason that it is also desirable to provide a spacer with a gasket which is to be disposed between two cold walls or two permeable membranes.

For heating the liquid from which one component is to be separated before delivering this liquid to inlet III, any known device could be used which is capable of applying heat to the liquid. For example, it would be possible to use a heat exchanger or a boiler heated by the Joule effect or by any type of fuel.

When it is desired to apply a slight pressure differential to the gaseous regions, any known devices could be used, such as blowers, for example.

The spacers 109, 110, 111 are made of corrugated and perforated polypropylene sheet so as not to prevent the liquid or gas flow through the chamber.

In order to illustrate the improvement afforded by the present invention, and particularly to illustrate that the energy which must be furnished in systems according to the invention is only a small fraction of that which it would have been theoretically necessary to furnish, a numerical example of the thermal conditions existing in apparatus of the type illustrated in FIG. 2 will be presented.

The temperature conditions which become established in the cell during normal operation are as follows:

$T_I$, the temperature of the liquid passing through inlet I, equals 20° C.

$T_{II}$, the temperature of the liquid passing through outlet II, equals 80° C.

$T_{III}$, the temperature of the liquid passing through inlet III, equals 81° C.

$T_{IV}$, the temperature of the liquid passing through outlet IV, equals 21° C.

Under these conditions, the thermal energy stored in a kilogram of liquid flowing between inlet I and outlet II is equal to $(80-20) \times (C_{sp})$ kcal., where $C_{sp}$ is the specific heat of the liquid under consideration. For water, this expression reduces approximately to: 60 kcal.

Experiments and theoretical calculations show that more than 80% of this heat is derived from the condensation of the vapor being separated. The energy recovered between inlet I and outlet II, and coming from the distillation operation, is thus of the order of 48 kcal. The energy furnished between outlet II and inlet III per kilogram of liquid is thus: $(81-80) \times (C_{sp})$ kcal. For water, this expression reduces approximately to: 1 kcal. Thus, the thermal performance ratio for the distillation operation is in this case 48.

It will be understood that the above description of the present invention is susceptible to various modifications, changes and adaptations, and the same are intended to be comprehended within the meaning and range of equivalents of the appended claims.

What is claimed is:

1. A device for separating at least one component from a liquid solution by evaporation of the component and subsequent condensation of the resulting vapor, comprising in combination:

means defining a plurality of first chambers for the circulation of the solution, a pair of walls of each of which chambers being permeable only to the vapor of the component to be separated;

means defining a plurality of second chambers for the circulation of a cooling fluid, a pair of walls of each of which second chambers constituting a cold wall arranged to permit condensate to flow down it;

each of said chambers having one transverse dimension which is substantially smaller than the other dimensions thereof so that two opposed sides of each of said chambers have a large area compared with the other sides thereof, said pair of permeable walls of said plurality of first chambers and said pair of cold walls of said plurality of second chambers being defined by large area sides of their respective chambers;

said chambers being arranged so that each of said permeable walls faces a respective cold wall and together define the walls of a plurality of a respective gaseous region into which the vaporous component diffuses from said first chamber, and in which such vaporous component condenses at and flows down its associated cold wall while transferring heat to the cooling fluid in the respective second chamber;

said chambers being stacked in such a way that a first chamber alternates with a second chamber and a gaseous region separates each adjacent pair of chambers; and means communicating with said chambers for delivering thereto the solution and the fluid at temperatures which cause the component to remain in its vapor state while traversing the gaseous region and to condense at said cold wall.

2. An arrangement as defined in claim 1 wherein said means defining a first chamber and said means defining a second chamber comprise, for each said chamber, two flat walls and a gasket having the configuration of a frame and interposed between said two flat walls, said arrangement further comprising, for each said gaseous region, a further gasket having the configuration of a frame and extending between two adjacent chambers to define the narrow edges of said gaseous region.

3. An arrangement as defined in claim 2 wherein said gaskets and flat walls are pressed together between two clamping plates.

4. An arrangement as defined in claim 2 wherein each of said gaskets is provided with a spacer which extends across the entire surface of said flat falls.

5. An arrangement as defined in claim 4 wherein said spacers are integral with their associated gaskets.

6. An arrangement as defined in claim 2 wherein each of said walls and gaskets is provided, along its edges, with holes, the holes in each said wall and gasket being aligned with the holes in the other said walls and gaskets to define inlet and outlet passages for said chambers.

References Cited

UNITED STATES PATENTS

| | | | |
|---|---|---|---|
| 2,386,826 | 10/1945 | Wallach et al. | 202—197X |
| 2,433,741 | 12/1947 | Crawford | 159—3X(Micro) |
| 3,129,145 | 4/1964 | Hassler | 202—174X |
| 3,340,186 | 9/1967 | Neyl | 203—11X |
| 3,361,645 | 1/1968 | Bodell | 202—177 |
| 3,398,091 | 8/1968 | Greatorex | 210—23 |
| 2,455,835 | 12/1948 | Ushakoff | 202—234 |
| 3,129,146 | 4/1964 | Hassler | 203—10X |
| 3,303,105 | 2/1967 | Konikoff et al. | 203—11 |
| 3,385,769 | 5/1968 | Brose | 202—197 |
| 3,386,912 | 6/1968 | Lazare | 210—22 |
| 3,406,096 | 10/1968 | Rodgers | 202—200X |
| 3,415,719 | 12/1968 | Telkes | 202—236X |

OTHER REFERENCES

Publication "Ultrafiltration" AICHE, May 15–18, 1966, pp. 129, 130 and 131.

WILBUR L. BASCOMB, JR., Primary Examiner

F. E. DRUMMOND, Assistant Examiner

U.S. Cl. X.R.

202—180, 236; 203—10, 89; 210—23